United States Patent
Laubenstein

(10) Patent No.: US 11,764,643 B2
(45) Date of Patent: Sep. 19, 2023

(54) GRAVITATIONAL ATMOSPHERIC SOLAR PUMP

(71) Applicant: John Laubenstein, Naperville, IL (US)

(72) Inventor: John Laubenstein, Naperville, IL (US)

(*) Notice: Subject to any disclaimer, the term of this patent is extended or adjusted under 35 U.S.C. 154(b) by 0 days.

(21) Appl. No.: 17/981,572

(22) Filed: Nov. 7, 2022

(65) Prior Publication Data

US 2023/0142373 A1    May 11, 2023

Related U.S. Application Data

(60) Provisional application No. 63/277,089, filed on Nov. 8, 2021.

(51) Int. Cl.
*H02K 7/18* (2006.01)
*F03G 6/00* (2006.01)
*F03G 3/00* (2006.01)

(52) U.S. Cl.
CPC ........... *H02K 7/1823* (2013.01); *F03G 3/087* (2021.08); *F03G 6/089* (2021.08)

(58) Field of Classification Search
CPC ....... H02K 7/1823; F03G 3/087; F03G 6/089; Y02E 10/46
See application file for complete search history.

(56) References Cited

FOREIGN PATENT DOCUMENTS

WO     WO-2022195611 A1 *  9/2022

* cited by examiner

*Primary Examiner* — Joseph Ortega
(74) *Attorney, Agent, or Firm* — Justin Lampel

(57) ABSTRACT

A gravitational atmospheric solar pump is provided. The gravitational atmospheric solar pump has a (preferably) cylindrical tube which is placed in a vertical orientation. Air enters the cylindrical tube at the top of the tube and travels downward exiting the opening at the bottom of the tube. An air flow initiator, such as a fan, creates the pressure needed to move the air downward. Blades located within the tube are rotated by the moving air. The pump captures energy by converting the motion of the blades to electricity through a connection to a generator. Throughout the tube, the air remains at a generally consistent density and temperature. The tube represents an open-air system, and air discharged at the bottom of the tube is returned to a higher elevation using solar energy separate from the energy requirements of the apparatus.

15 Claims, 10 Drawing Sheets

GRAVITATIONAL ATMOSPHERIC SOLAR PUMP

REFERENCE TO RELATED APPLICATIONS

This application claims priority to U.S. Provisional Application No. 63/277,089 titled "GRAVITATIONAL ATMOSPHERIC SOLAR PUMP" which was filed on Nov. 8, 2021, the entire contents of which are incorporated by reference herein.

BACKGROUND OF THE INVENTION

A gravitational atmospheric solar pump is provided. The gravitational atmospheric solar pump has a (preferably) cylindrical tube which is placed in a vertical orientation. Air enters the cylindrical tube at the top of the tube and travels downward exiting the opening at the bottom of the tube. An air flow initiator, such as a fan, creates the pressure needed to move the air downward. Blades located within the tube are rotated by the moving air. The pump captures energy by converting the motion of the blades to electricity through a connection to a generator. Throughout the tube, the air remains at a generally consistent density and temperature. The tube represents an open-air system, and air discharged at the bottom of the tube is returned to a higher elevation using solar energy separate from the energy requirements of the apparatus.

Gravitational pumps are known. For example, U.S. Pat. No. 4,182,124 to Kraus discloses power-producing device, comprising a vertically oriented chamber of enormous height, incorporating within its upper end an electric motor-driven, aftercooled air compressor, being connected via suitable power transmission, to an electric generator driving, reheated air turbine, located within the lower chamber end. Atmospheric air is compressed at a given rate of flow to a given pressure into the upper chamber end, which, due to the gravitational force exerted on its compressed mass, and due to the chamber height, is expanded within the turbine at the lower chamber end at an equal rate of flow, but, at a substantially higher pressure, and at a substantial gain in energy, thus, producing a substantially greater amount of work than is consumed by the compressor.

Further, U.S. Pat. No. 3,436,908 to Van Delic discloses a solar air moving apparatus comprising an upwardly extending, open ended hollow tube exposed to the rays of the sun, but protected from conduction and convection heat transmission to the ground and atmosphere. The tube is heated by radiation from the sun and the air inside the tube is heated and expands and becomes lighter, and is displaced by atmospheric air through the bottom opening of the tube, thus creating an air flow through the tube.

However, these patents fail to describe a gravitational atmospheric solar pump which is easy to use, and does not require a change in the density or temperature of the air within the tube. Further, these patents fail to provide for a gravitational atmospheric solar pump which is efficient and captures usable energy that otherwise would be lost as heat to the greater surroundings.

SUMMARY OF THE INVENTION

A gravitational atmospheric solar pump is provided. The gravitational atmospheric solar pump has a (preferably) cylindrical tube which is placed in a vertical orientation. Air enters the cylindrical tube at the top of the tube and travels downward exiting the opening at the bottom of the tube. An air flow initiator, such as a fan, creates the pressure needed to move the air downward. Blades located within the tube are rotated by the moving air. The pump captures energy by converting the motion of the blades to electricity through a connection to a generator. Throughout the tube, the air remains at a generally consistent density and temperature. The tube represents an open-air system, and air discharged at the bottom of the tube is returned to a higher elevation using solar energy separate from the energy requirements of the apparatus.

An advantage of the present gravitational atmospheric solar pump is that the present pump harvests energy directly from gravitation and converts energy that would typically be lost to the greater surrounding as heat into usable energy forms such as, but not limited to, electricity.

Another advantage of the present gravitational atmospheric solar pump is that the present device generates energy while the density of the air traveling through the tube remains generally constant.

Yet another advantage of the present gravitational atmospheric solar pump is that the present device generates energy while the temperature of the air traveling through the tube remains generally constant.

Still another advantage of the present gravitational atmospheric solar pump is that the pump is light weight and easily adapted to use in buildings and houses.

For a more complete understanding of the above listed features and advantages of the gravitational atmospheric solar pump reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

Figure 1:
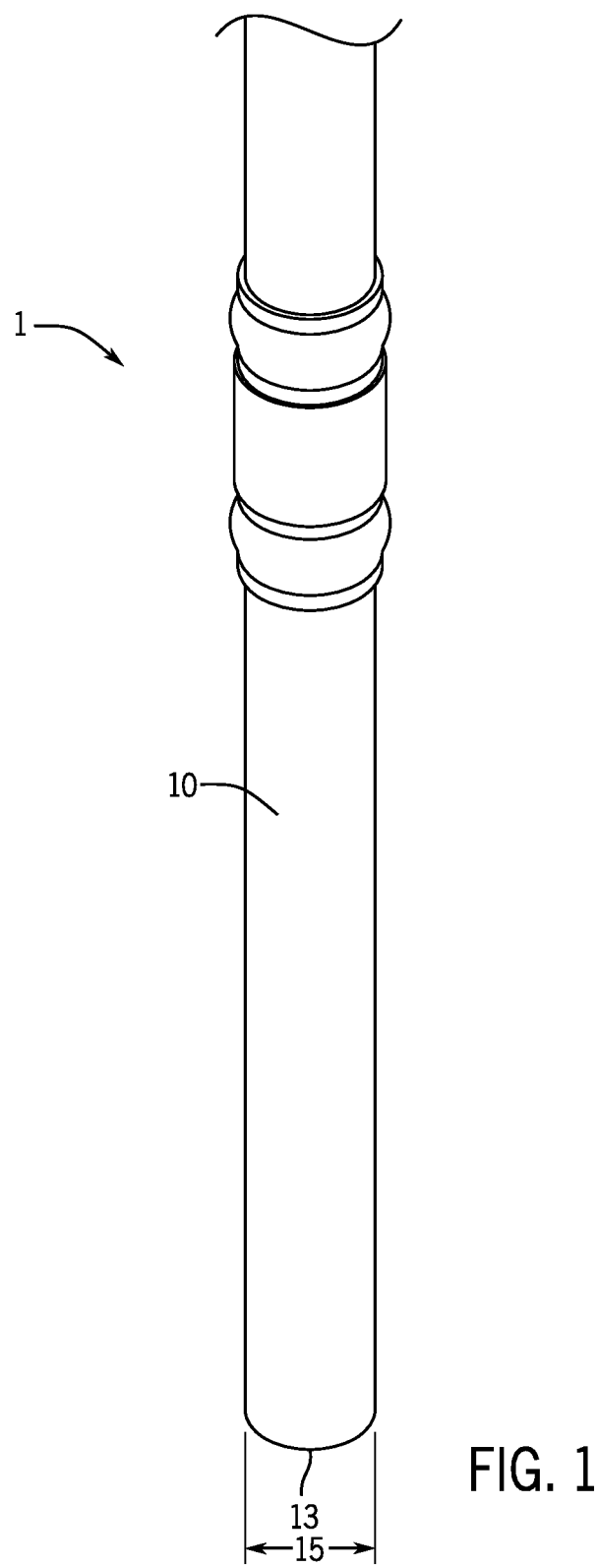
FIG. 1 illustrates a perspective view of the exterior of the cylindrical tube.
Figure 2:
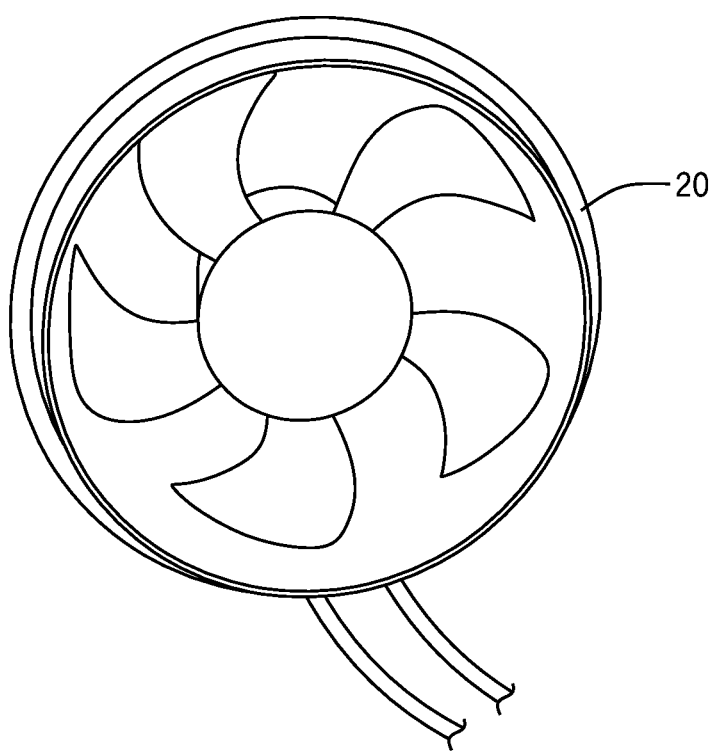
FIG. 2 illustrates a view of the fan of the pump in one embodiment.

A gravitational atmospheric solar pump is provided. The gravitational atmospheric solar pump has a (preferably) cylindrical tube which is placed in a vertical orientation. Air enters the cylindrical tube at the top of the tube and travels downward exiting the opening at the bottom of the tube. An air flow initiator, such as a fan, creates the pressure needed to move the air downward. Blades located within the tube are rotated by the moving air. The pump captures energy by converting the motion of the blades to electricity through a connection to a generator. Throughout the tube, the air remains at a generally consistent density and temperature. The tube represents an open-air system, and air discharged at the bottom of the tube is returned to a higher elevation using solar energy separate from the energy requirements of the apparatus.

The gravitational atmospheric solar pump (GASP) is designed to harvest energy directly from gravitation into useable forms such as, but not limited to, electricity. Referring now to the figures, a gravitational atmospheric solar pump 1 is provided. The pump 1 is preferably cylindrical in shape, but may be of various other shapes. The pump 1 may have a tube unit 10 having an exterior 11, an open top 12, an open bottom 13 and an interior 14. The tube unit 10 may have a diameter 15 and a length 16. With negligible friction, the performance increases with the tube length 16 increasing. In use, the tube unit 10 is generally positioned in a vertical orientation with respect to the ground so as to allow the downward flow of air 30 from the top 12 of the tube unit 10 to the bottom 13 of the tube unit 10. The airflow is generally complex and consists of laminar 30a, circular 30b and turbulent 30c motion.

In an embodiment, an air flow initiator (such as a fan or air compressor) 20 may be associated with the tube unit 10. The air flow initiator 20 may be located at the open top 12 of the tube unit 10. The air flow initiator 20 may be used to provide an initial pressure to the air molecules 30 to therein create the air flow 30 downward, through the interior 14 of the tube unit 10. The unit produces more energy than is spent on the air flow initiator 20.

Figure 3:
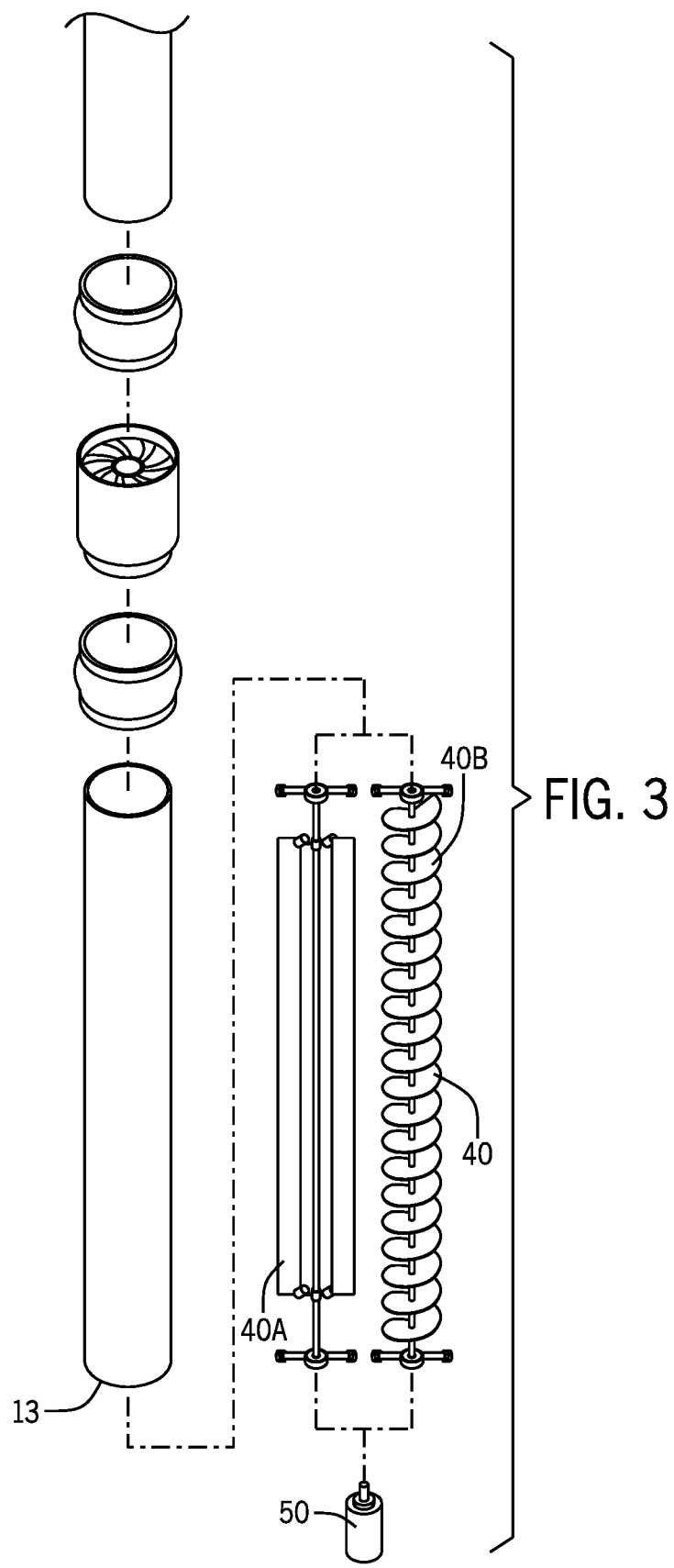
FIG. 3 illustrates an exploded view of the entire pump in one embodiment.
Figure 4:
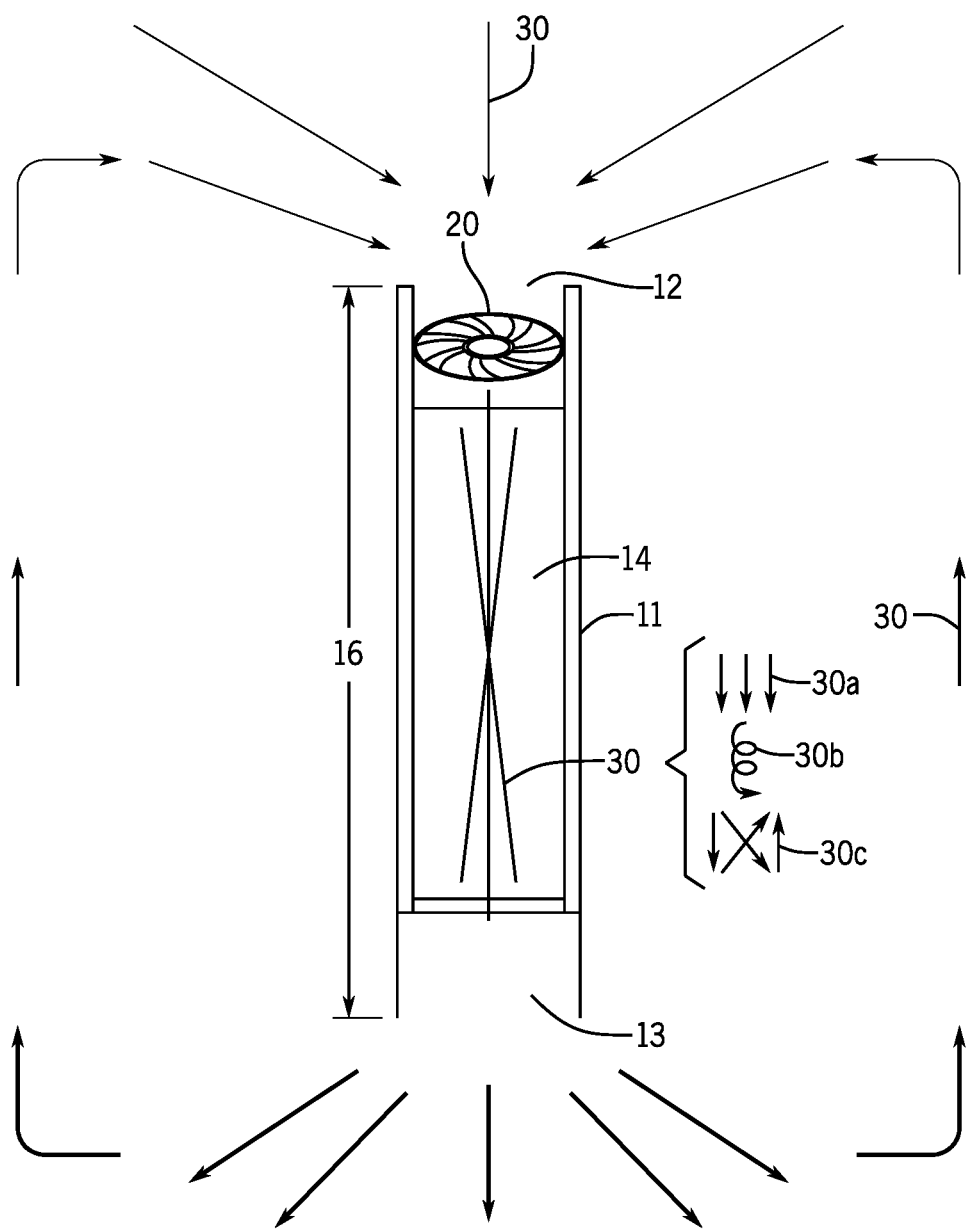
FIG. 4 illustrates a view of the air flow in and around the pump in one embodiment.

In an embodiment, located within the interior 14 of the tube unit 10 may be a rotation unit 40 (or auger). The rotation unit 40 may be, for example, a generally elongated blade element (as shown as element 40A in FIG. 3), a spiral element (shown as FIG. 40B in FIG. 3), or some other element that may rotate when acted upon by downward flowing air 30. Preferably, the rotation unit 40 rotates around an elongated axis which passes down the center of the interior 14 of the tube unit 10.

In an embodiment, the pump 1 may have a generator 50. The generator 50 may be attached to the rotation unit 40 in one embodiment. In an embodiment, the generator 50 may be located within the interior 14 of the tube unit 10, at or near the bottom 13 of the tube unit 10. The generator 50 may be used to generate, collect and convert the energy created by the air molecules 30 turning the rotation unit 40.

Figure 5:
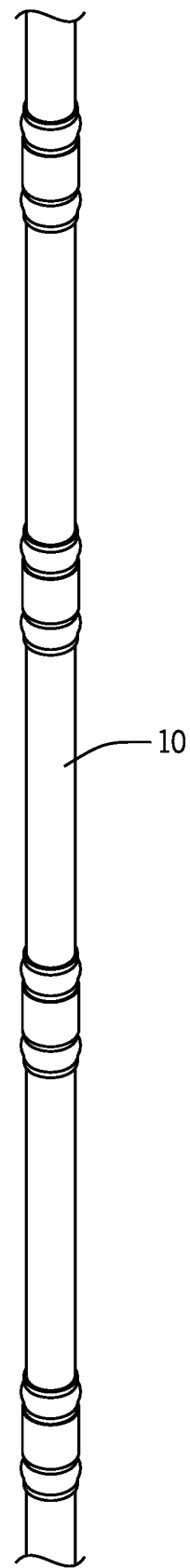
FIG. 5 shows a perspective view of the exterior cylindrical tube in one embodiment.

In an embodiment, a series of tube units 10 (each having a rotation unit 40, generator 50 and air flow initiator 20) may be used on top of each other as shown in FIG. 5). Use of multiple tube units 10 together in may increase the total energy output.

Figure 8:
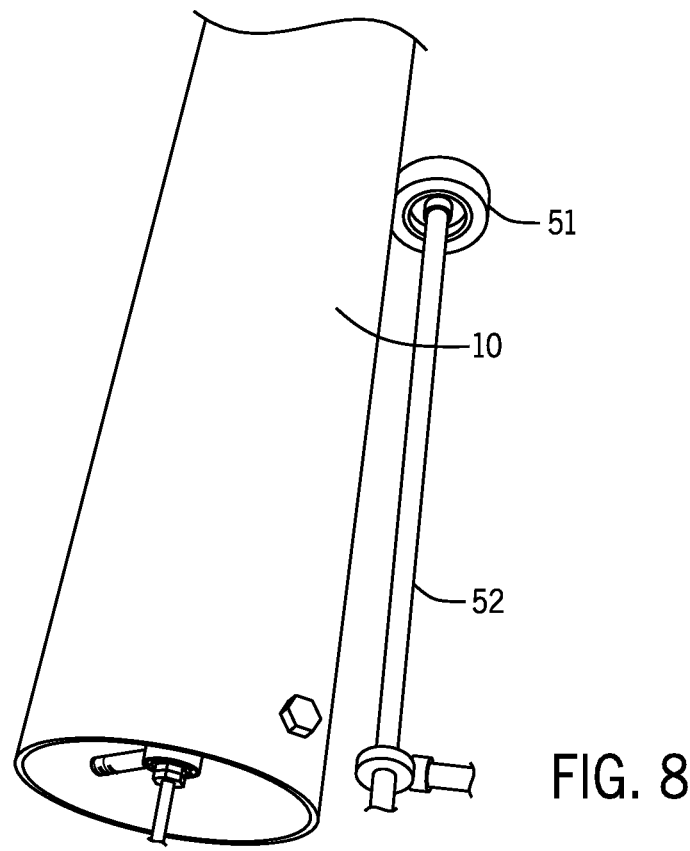
FIG. 8 shows an external rotation device that captures the mechanical motion of the tube in an embodiment.
Figure 9:
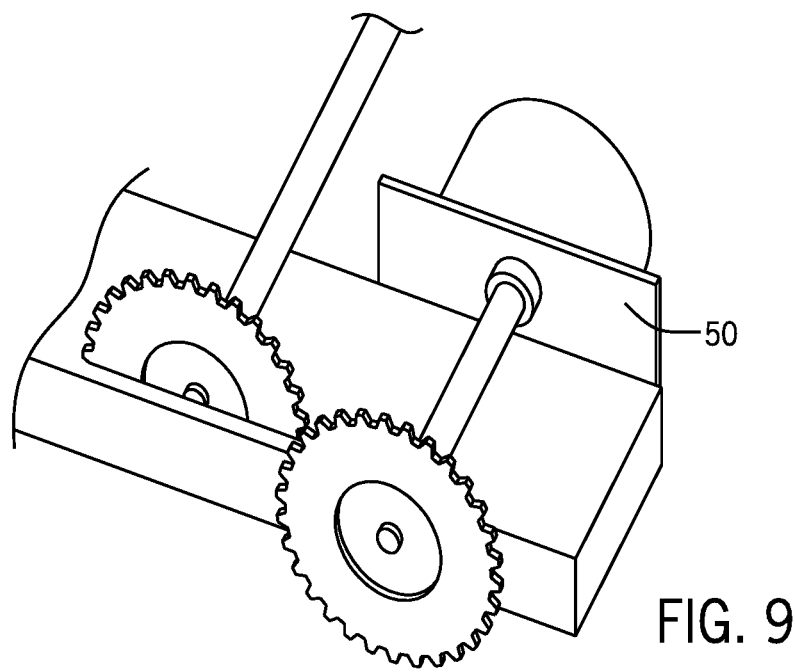
FIG. 9 shows the connection of the external rotating device to a generator in an embodiment.

In an alternative embodiment as shown in FIG. 8, an optional rotating wheel 51 connected to an axis pole 52 may be positioned on the exterior surface 11 of the tube 10. The optional wheel 51 may be spun through its contact with the tube 10 which is rotating under the influence of the circular air movement within the interior 14 of the tube 10. In the embodiment therein the tube unit 10 actually spins (FIG. 8), the tube unit 10 may be affixed to central axis by arms 48 connected to a ball bearing ring 49 that allows for the tube unit 10 to spin with negligible friction. Blades 220 (or 221) may be used to maximize the rotation of tube 10. The generator 50 may use either step-up or step-down gears to maximize the rotation of the axis pole 52 with the functionality of the generator 50 (FIG. 9).

Figure 10:
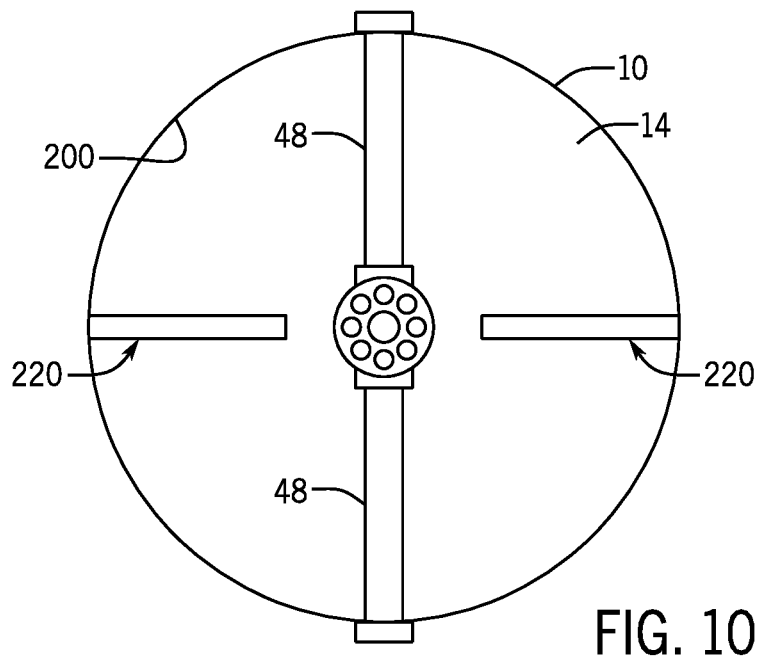
FIG. 10 illustrates a cross section of the tube wherein permanent blades are secured to an interior wall of the tube.
Figure 11:
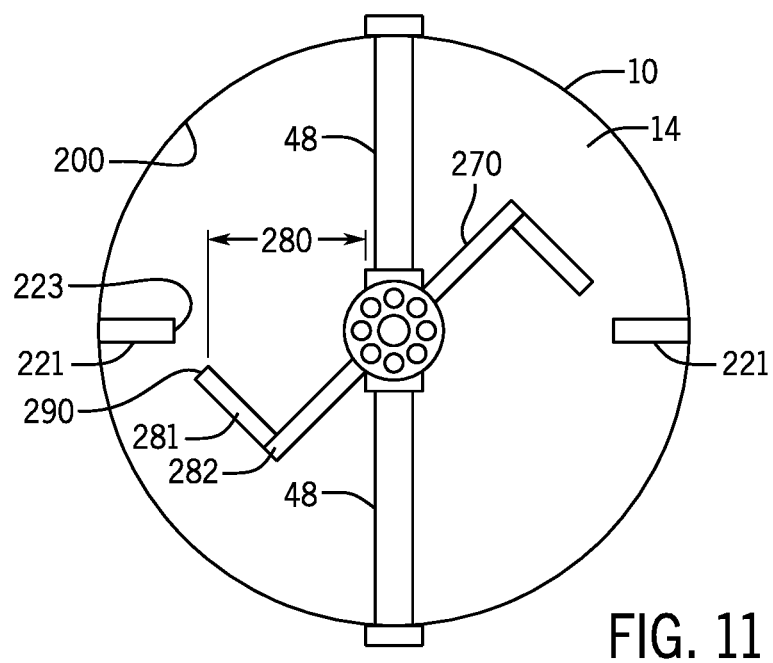
FIG. 11 illustrates a cross section of the tube wherein permanent, but smaller, blades are attached to the interior wall of the tube and wherein the tube also includes the rotating unit in the center of the interior of the tube.

Referring now to FIG. 10, the device 1 may have permanently secured side blades 220 which are secured to an interior wall 200 of the tube 10. In the preferred embodiment, the side blades 220 take up approximately 35-45% (preferably 40%) of the diameter 15 of the tube 10 for optimal performance. The permanently secured side blades 220 must be balanced and equally spaced. FIGS. 10 and 11 illustrate two side blades within the interior 14 of the tube unit 10 in each version (#220 in FIG. 10 and #221 in FIG. 11); however, additional side blades 220 (or 221) may be used provided that the blades 220 (or 221) are equally spaced from each other on the interior wall 200 of the tube 10. Having the blades 220 (or 221) equally spaced ensures proper air flow as well as balanced rotation of tube 10 and, therefore, maximized energy creation by the device 1. Ideally, the contact surface area between the moving air 30 and the blades 220 is maximized (or 221), but not to the point that the air flow 30 decreases in velocity as it travels downward through the interior 14 of the tube 10.

Figure 6:
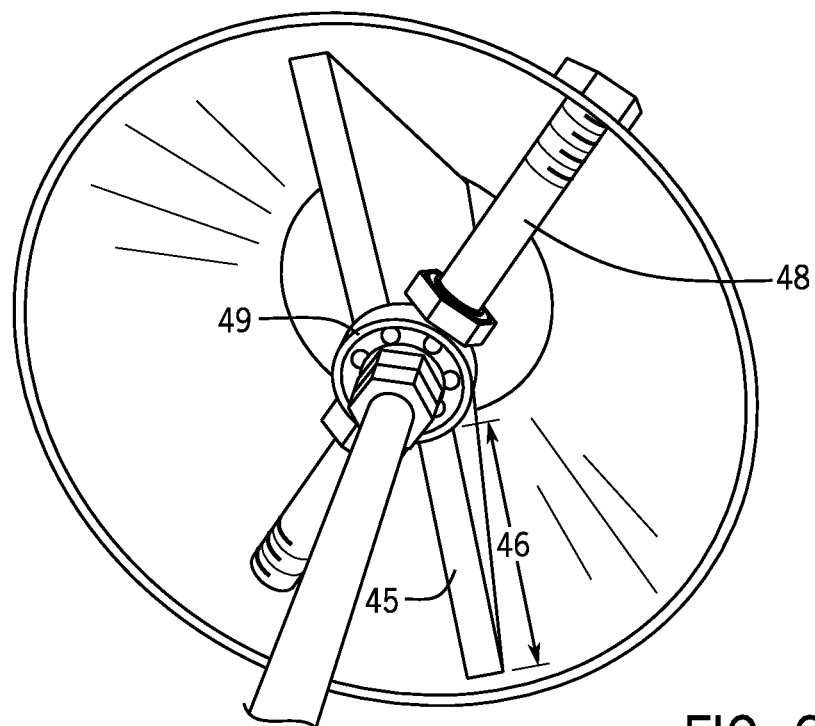
FIG. 6 illustrates the blade positioning at the top of the tube in an embodiment.

FIG. 6 illustrates another alternative embodiment of the blades 45 (the blades are labeled 45 in this figure). The thickness of the blades 45 should be a thin as possible while maintaining structural integrity during rotation. The blades may also have a length 46.

Figure 7:
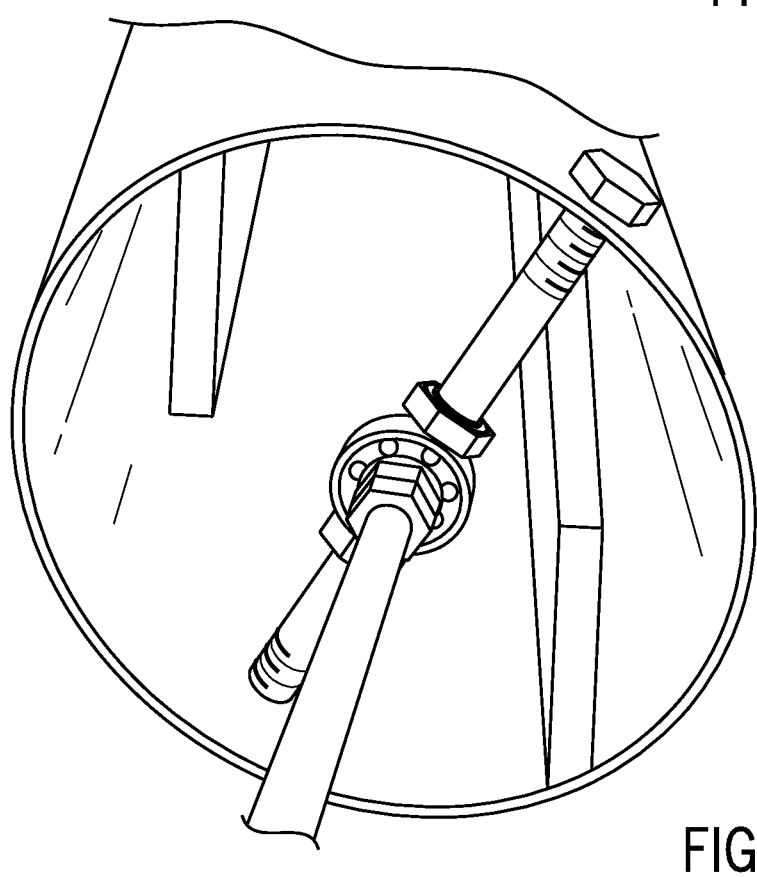
FIG. 7 illustrates the blade positioning at the bottom of the tube in an embodiment.

Preferably, the blades 45 extend substantially all the way though the length 16 of the tube unit 10. However, the blades 45 are preferably pitched such that on the bottom 13 of the tube unit 10 they appear to be offset from the center axis and are no longer positioned in a linear alignment with each other (FIG. 7). The degree to which they should be offset is determined by many factors including the power of the fan 20, the power delivered to the fan 20, the tube 10 diameter and length 16 and the degree of friction within the tube interior 14. The position of the blades 45 on the bottom 13 of the tube unit 10 may be calibrated by making incremental adjustments until such time as an additional adjustment results in a significant decrease in the rate of airflow, generally measured as cubic feet per minute (CFM).

The blades 45 are preferably placed opposite each other within the interior 14 of the tube unit 10 so as to maintain uniform balance of the rotating tube 10. More than two blades 45 may be added and/or other components 40 may be included within the interior 14 of the tube unit 10 to further maximize the contact between the moving air 30 and the surface area of the blade 45 of the rotation unit 40 within the interior 14 of the tube unit 10.

Referring now to FIG. 11, in yet another embodiment, the interior 14 of the tube 10 may have smaller side blades 221 secured to the interior side wall 200. In this embodiment, the smaller permanent side blades 221 are approximately 5-15% (preferably 10%) of the diameter 15 of the tube 10. In this embodiment, the interior rotating unit 40 is also used in addition to the permanent side blades 221. In this embodiment, the rotating unit 40 has two arms 270 on opposing sides of the center of the tube 10. The total length 280 of each arm 270 is approximately 25-35% (preferably 30%) the total diameter 15 of the tube 10. Each side of the arm unit 270 may be made of a first surface 281 and second surface 282 which are preferably at right angles with respect to each other. It should be understood that the rotating unit 40 of FIG. 11 may also be the spiral device version (40B) as opposed to the one shown in FIG. 11.

Preferably, the gap between the terminal end 223 of each of the side blades 221 and the end 290 of the arm 281 of the interior rotation unit 40 (as seen in FIG. 11) is between 5-10% (preferably 7%) of the total diameter 15 of the tube 10. This results in optimal energy generation. For illustrative purposes, FIG. 11 is not drawn to scale.

Figure 12:
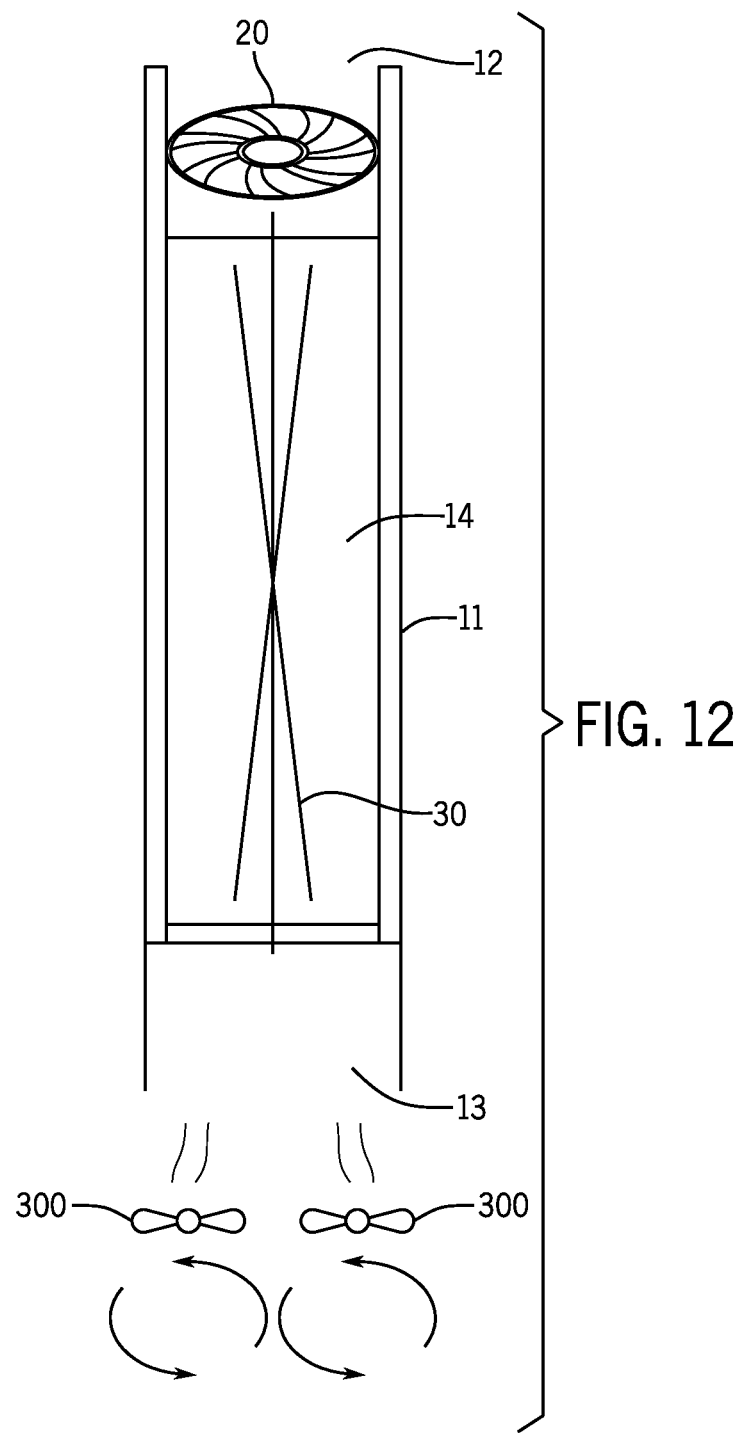
FIG. 12 illustrates an embodiment wherein optional fans are added to the bottom of the tube at the opening of the bottom of the tube.

Referring now to FIG. 12, in an embodiment, optional fans 300 connected to generators may be located at the opening 13 of the bottom of the tube 10 to further capture energy. Optimally, the fans 300 are located 6 to 12 inches (preferably 9 inches) below the opening 13 of the bottom of the tube unit 10 to best capture the energy of the air exiting the interior 14 of the tube unit 10.

Figure 13:
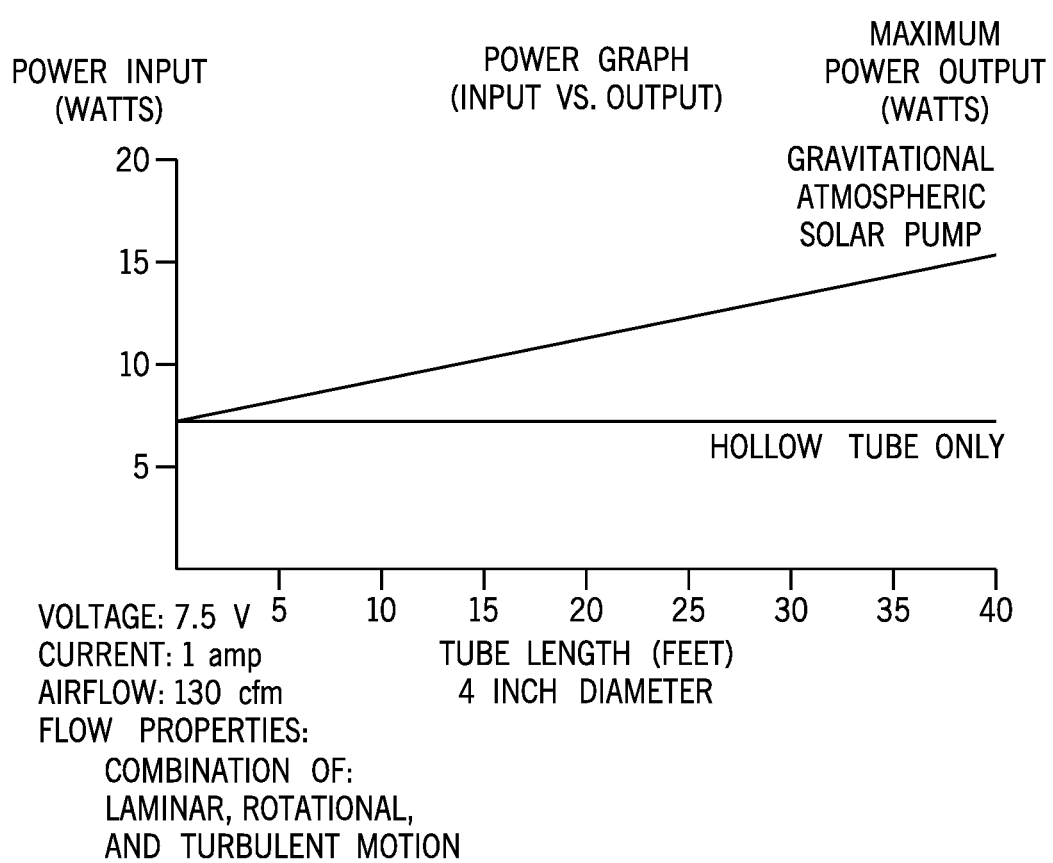
FIG. 13 is a graph representing the power generated using the present device.

Referring now to FIG. 13, a graph is illustrated demonstrating the potential power produced. FIG. 13 illustrates the power input vs output in using the present gravitational atmospheric solar pump.

The gravitational atmospheric solar pump (GASP) is designed to harvest energy directly from gravitation into useable forms such as, but not limited to, electricity. As air 30 moves downward through the interior 14 of the tube unit 10, the natural and preferred path (NPP) for each molecule of air 30 is to gain velocity as it moves through a changing gravitational gradient. However, the differential in air pressure between the top 12 of the tube unit 10 and the bottom 13 of the tube unit 10 column requires the air 30 flow to proceed through the interior 14 of the tube unit 10 at a constant velocity and with relatively constant temperature and density. This can be viewed as an unbalanced force acting upward against the NPP of the air 30 which prevents the air 30 from gaining velocity.

The result is that energy is dispersed (generally in the form of heat and/or vibration) into the greater environment as the air 30 moves downward through the interior 14 of the tube unit 10. The present GASP device 1 harvests this energy by requiring the downward moving air 30 to turn a mechanical device (the rotation unit 40 and/or tube 10) which can then be used to generate electricity or other useable forms of energy that would otherwise be "lost" as heat and vibration. Air 30 released at the bottom 13 of the tube unit 10 is ultimately returned to a higher elevation through solar/radiant energy that is provided outside of the energy requirements of the GASP apparatus 1 and thereby completing the airflow cycle.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A gravitational atmospheric solar pump comprising:
   a tube unit having a top, a bottom, an exterior surface, an interior surface and a generally hollow interior;
   a first opening at the top of the tube unit;
   a second opening at the bottom of the tube unit;
   an air flow initiator located at the first opening of the top of the tube unit wherein the air flow initiator is capable of forcing air flow downward through the tube unit;
   a generator located at the bottom of the tube unit within the interior of the tube unit or directly below the second opening at the bottom of the tube unit;
   a blade or fin located within the hollow interior of the tube unit wherein air flow passing from the first opening of the tube unit to the second opening of the tube unit acts upon the blade or fin and moves the tube unit by acting on the blade or fin;
   wherein the generator receives the air flow exiting the second opening of the tube unit and generates energy; and
   wherein the blade or fin is permanently secured to the interior surface of the tube unit and wherein the blade or fin moves in unison with the rotation of the of the tube.

2. The gravitational atmospheric solar pump of claim 1 wherein the tube unit is positioned in a vertical orientation.

3. The gravitational atmospheric solar pump of claim 1 wherein the tube unit is cylindrical.

4. The gravitational atmospheric solar pump of claim 1 wherein the blade or fin is not permanently connected to the interior surface of the tube unit.

5. The gravitational atmospheric solar pump of claim 1 wherein the blade or fin is planar.

6. The gravitational atmospheric solar pump of claim 1 wherein the blade or fin has a first arm unit and a second arm unit and wherein the first arm unit and the second arm unit each have a first surface and a second surface.

7. The gravitational atmospheric solar pump of claim 6 wherein the first surface and the second surface are at a right angle with respect to each other.

8. The gravitational atmospheric solar pump of claim 1 further comprising:
   a fan located at the second opening of the tube unit wherein the fan receives the downward air flow and generates energy.

9. A gravitational atmospheric solar pump comprising:
   a tube unit having a top, a bottom, an exterior surface, an interior surface and a generally hollow interior;
   a first opening at the top of the tube unit;
   a second opening at the bottom of the tube unit;
   an air flow initiator located at the first opening of the top of the tube unit wherein the air flow initiator is capable of forcing air flow downward through the tube unit;
   a blade or fin located within the interior of the tube unit wherein the downward air flow acts upon the blade or fin and rotates the tube unit;
   a wheel located outside of the tube unit and touching the exterior surface of the tube unit;
   an axis pole having a first end and a second end wherein the axis pole is connected to the wheel at the first end; and
   a generator connected to the axis pole at the second end of the access pole wherein the generator is activated by the rotation of the tube unit rotating the wheel.

10. The gravitational atmospheric solar pump of claim 8 wherein the tube unit is positioned in a vertical orientation.

11. The gravitational atmospheric solar pump of claim 8 wherein the tube unit is cylindrical.

12. The gravitational atmospheric solar pump of claim 8 wherein the blade or fin is permanently secured to the interior surface of the tube unit.

13. The gravitational atmospheric solar pump of claim 8 wherein the blade or fin is not permanently secured to the interior surface of the tube unit.

14. The gravitational atmospheric solar pump of claim 8 wherein the blade or fin is planar.

15. The gravitational atmospheric solar pump of claim 8 wherein the blade or fin has a first arm unit and a second arm unit and wherein the first arm unit and the second arm unit each have a first surface and a second surface.

* * * * *